United States Patent [19]

David et al.

[11] 4,078,647

[45] Mar. 14, 1978

[54] APPARATUS FOR TRANSPORTING CIGARETTES OR THE LIKE

[75] Inventors: Harry David, Hamburg; Willy Rudszinat, Dassendorf, both of Germany

[73] Assignee: Hauni-Werke Körber & Co. KG, Hamburg, Germany

[21] Appl. No.: 515,320

[22] Filed: Oct. 16, 1974

[30] Foreign Application Priority Data

Dec. 7, 1973 Germany .................. 2361049

[51] Int. Cl.² ........................... B65G 47/00
[52] U.S. Cl. .................... 198/347; 198/626
[58] Field of Search ............ 198/37, 44, 47, 76, 198/110, 165, 347, 575, 626, 627, 628; 222/55, 415

[56] References Cited

U.S. PATENT DOCUMENTS

| 3,280,961 | 10/1966 | McCombie | 222/415 |
| 3,640,375 | 2/1972 | Reimers | 198/165 |
| 3,885,683 | 5/1975 | Bonnfleth | 198/37 X |

FOREIGN PATENT DOCUMENTS

| 1,957,002 | 9/1970 | Germany | 198/575 |
| 641,872 | 8/1950 | United Kingdom | 198/626 |

OTHER PUBLICATIONS

Research Disclosure, No. 125, 5611, Sept. 1974 section 12508.

Primary Examiner—Bruce H. Stoner, Jr.
Assistant Examiner—Douglas D. Watts
Attorney, Agent, or Firm—Peter K. Kontler; John Kurucz

[57] ABSTRACT

Blocks or streams consisting of one or more layers of cigarettes can be transported by one or more endless conveyors wherein an endless band-like or rim-like carrier is surrounded by a pile of elastically deformable bristles which engage and entrain the adjacent layer or layers of cigarettes when the conveyors are in motion. The conveyors may be used to evacuate selected blocks of arrayed cigarettes from a packing machine or to cooperate with each other or with conventional belt conveyors in order to transport cigarettes sideways to the inlet of the magazine in a packing machine.

7 Claims, 8 Drawing Figures

APPARATUS FOR TRANSPORTING CIGARETTES OR THE LIKE

BACKGROUND OF THE INVENTION

The present invention relates to improvements in apparatus for the manufacture and/or processing of rod-shaped smokers' products including filter rod sections and plain or filter-tipped cigarettes, cigarillos or cigars. More particularly, the invention relates to improvements in means for transporting rod-shaped articles of the tobacco industry in, to or from a discrete consuming or processing machine (e.g., a packing machine for cigarettes) or for transporting cigarettes or the like in a production line including one or more makers (e.g., machines for the making of plain or filter-tipped cigarettes) and one or more consumers (such as filter cigarette making machines or packing machines). Still more particularly, the invention relates to improvements in apparatus which can be used for simultaneous transport of one or more layers of parallel cigarettes or analogous rod-shaped articles, preferably in such a way that the articles travel sideways.

It is already known to coat conveyors for cigarettes with layers of foam rubber or similar continuous bodies of deformable material. The deformable layers are intended to reduce the likelihood of deformation of cigarettes, especially during transport from a first level to a higher or lower second level. Such conveyors have met with limited success because the useful life of foam rubber layers is relatively short, because of premature aging, because the layers are likely to be contaminated and/or to accumulate excessive quantities of moisture, and because the layers tend to peel off their supports. Moreover, such conveyors are not suited for the transport of blocks or streams which consist of several layers of cigarettes, cigars, cigarillos or filter rod sections.

SUMMARY OF THE INVENTION

An object of the invention is to provide a novel and improved conveyor which can transport cigarettes or analogous rod-shaped articles of the tobacco industry without any deformation of and/or other damage to the articles, which can stand long periods of continuous or intermittent use, which can transport with equal facility a single layer of delicate rod-shaped articles or a stream or a series of blocks or groups consisting of several layers of articles, and which can be used in existing machines or production lines for the manufacture and/or processing of rod-shaped smokers' products.

Another object of the invention is to provide a conveyor which can cooperate with one or more similar or conventional conveyors to transport multi-layer streams or blocks of rod-shaped articles between different levels.

A further object of the invention is to provide apparatus which embody one or more improved conveyors of the above outlined character.

An additional object of the invention is to provide a novel and improved endless conveyor for moving rod-shaped articles sideways through short, medium or long distances.

Still another object of the invention is to provide an apparatus which embodies several improved conveyors, particularly a packing machine for cigarettes or the like or a unit which transports cigarettes or the like to the magazine of a packing machine.

A feature of the invention resides in the provision of an apparatus for the manufacture and/or processing of cigarettes or analogous rod-shaped articles, e.g., in the provision of a production line including at least one maker (such as a machine for the manufacture of plain or filter-tipped cigarettes) and at least one consumer (such as a packing machine which is directly or indirectly coupled to the maker). The apparatus comprises at least one conveyor having a pile of elastically deformable flexible filaments (e.g., relatively soft bristles) and means for moving the pile adjacent to a predetermined path so that the filaments travel sideways, and means for feeding rod-shaped articles into the path so that the articles extend substantially transversely of the direction of movement of the pile whereby the filaments yieldably engage and move the articles sideways along the path. The pile is preferably endless and the conveyor further includes an endless flexible band- or belt-like carrier for the pile. The carrier has a side which faces the path for rod-shaped articles, and one end of each filament is secured (e.g., made integral or glued) to the carrier. The filaments extend from the aforementioned side of the carrier toward the path.

The apparatus may comprise two conveyors whose piles are adjacent to opposite sides of the path and which are preferably driven at identical speeds and in such a way that one of the conveyors is stopped or started in response to stopping or starting of the other conveyor. Those filaments of the two piles which are adjacent to the path travel in the same direction.

The first mentioned conveyor can be used in combination with an endless flexible conveyor which need not have a pile of elastically deformable filaments, e.g., with a conventional belt or band conveyor. The belt or band conveyor then comprises a stretch which is adjacent to the path opposite the pile of the first mentioned conveyor. When the apparatus comprises two conveyors (at least one of which has a pile of filaments), the two conveyors can be used to transport a single layer or several layers of rod-shaped articles along an elongated path having a first portion located at a first level, a second portion located at a second level, and an at least partially arcuate intermediate portion extending between and having ends merging into the first and second portions. Such conveyors can be used to transport a multi-layer stream of rod-shaped articles from a higher level to a lower level, from a lower level to a higher level, or from a given level back to the same level but along a path a portion of which extends above and/or below the given level, e.g., along a path which meanders in a horizontal or vertical plane.

In accordance with another feature of the invention, the apparatus may comprise a receptacle (e.g., the magazine or bin of a cigarette packing machine) having an inlet (this inlet may constitute the outlet of a variable-capacity magazine for temporary storage of cigarettes), a first endless flexible conveyor defining an elongated path having a discharge end above and at one side of the inlet, means (e.g., the take-off conveyor of a cigarette making machine) for feeding into the path a multi-layer stream of rod-shaped articles so that the articles extend substantially or exactly at right angles to the direction of movement of the first conveyor and the first conveyor moves the stream toward and into the inlet whereby the articles of the stream travel sideways, a second endless flexible conveyor (this conveyor may constitute the mobile bottom of the aforementioned variable-volume magazine) having a preferably horizontal upper stretch located above and at the other side of the inlet to receive and store articles of the stream when the inlet is filled with articles while the first conveyor continues to move the stream toward the inlet, and drive means which is actuatable to move the upper stretch of the second conveyor toward and away from the inlet whereby the quantity of articles which are stored on the upper stretch of the second conveyor respectively decreases and increases. The second conveyor can feed articles into the inlet when the feeding of articles by the first conveyor is interrupted or the first conveyor is stopped. The second conveyor receives articles from the first conveyor when the rate at which the machine including the receptacle consumes or processes the articles is reduced or the machine is stopped. The first or second conveyor can cooperate with one or more conveyors having a pile of flexible filaments.

The novel features which are considered as characteristic of the invention are set forth in particular in the appended claims. The improved conveyor itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 4 (composed of FIGS. 4a and 4b) shows an apparatus which embodies one improved conveyor and is used to transport cigarettes from a maker to a variable-volume magazine or to the receptacle of a packing machine;

DESCRIPTION OF THE PREFERRED EMBODIMENTS

Figures 1, 2, 3:
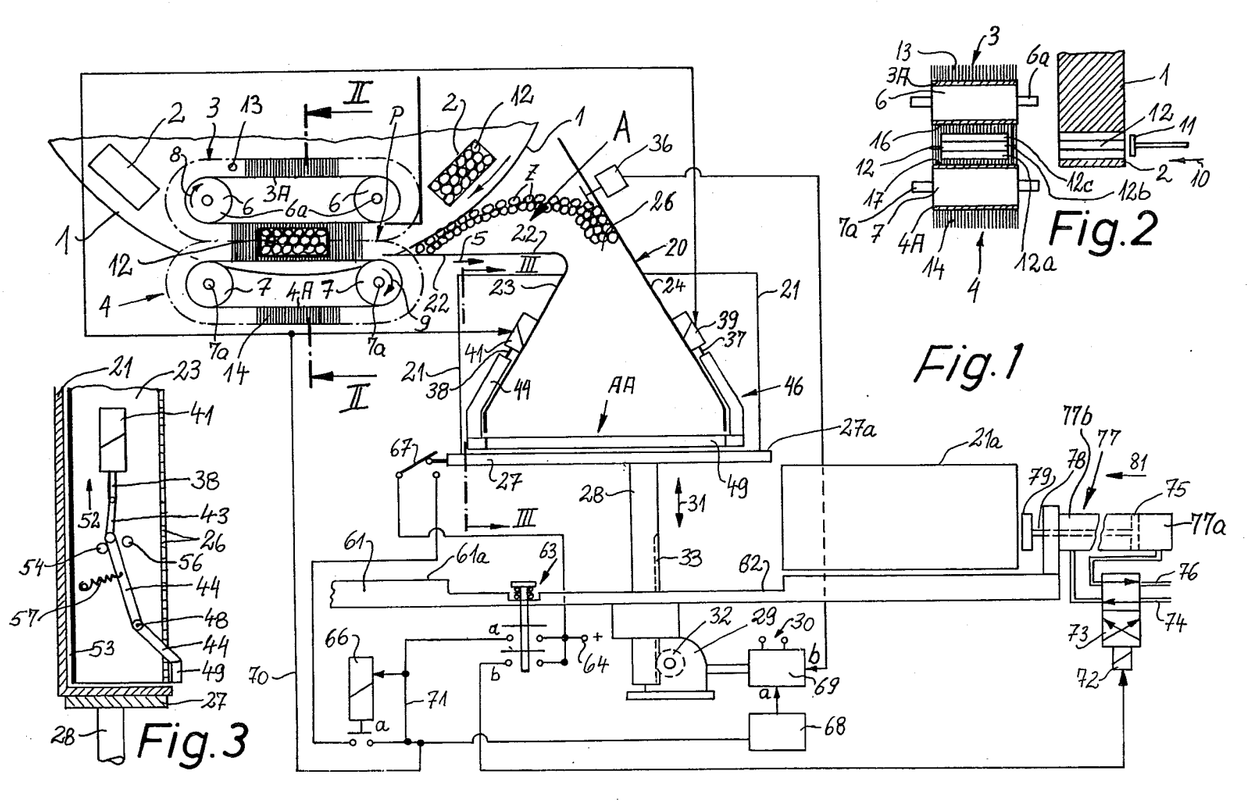
FIG. 1 is a fragmentary side elevational view of a cigarette packing machine and of an apparatus which embodies two improved conveyors and is utilized to remove blocks of arrayed cigarettes from the packing machine.
FIG. 2 is a sectional view as seen in the direction of arrows from the line II—II of FIG. 1.
FIG. 3 is a sectional view as seen in the direction of arrows from the line III—III of FIG. 1.

FIGS. 1 to 3 show a portion of a packing machine for plain or filter-tipped cigarettes Z which cooperates with two endless conveyors 3 and 4 embodying the present invention. The packing machine comprises an intermittently driven rotary indexible conveyor 1 here shown as a turret having an annulus of receptacles or pockets 2 for groups or blocks 12 of cigarettes Z. The dimensions of the pockets 2 and groups 12 with respect to the dimensions of the turret 1 are exaggerated for the sake of clarity. The aforementioned conveyors 3 and 4 are adjacent to one side of the turret 1 and their neighboring stretches define an elongated straight path P which is adjacent to a portion of the endless path for the pockets 2. The purpose of the conveyors 3, 4 is to accept and transport blocks 12 which are defective (e.g., because they do not contain a requisite number of cigarettes Z) or to transport blocks which could not be introduced into partially finished soft or flip-top packs due to the failure of other conveyors of the packing machine to deliver blanks of or prefabricated packs to the region where the blocks 12 are normally brought in contact with blanks and/or packs. In the illustrated embodiment, the turret 1 is indexible about a horizontal axis and the two endless conveyors 3, 4 are located in a common vertical plane and can receive blocks 12 of cigarettes Z which are located at the 6 o'clock position of the turret, as viewed in FIG. 1.

The upper endless conveyor 3 comprises an endless flexible belt-like carrier 3A which is trained over two pulleys 6 at least one of which is driven by a moving means including a suitable motor or transmission serving to transmit torque to the respective shaft 6a. The carrier 3A has an outer side or surface 16 (FIG. 2) and the conveyor 3 further comprises a pile of elongated filaments or bristles 13 each having one end secured to the carrier 3A and each extending outwardly from the endless surface 16. The direction in which the pulleys 6 rotate when driven by at least one of the shafts 6a is indicated by an arrow 8.

The second conveyor 4 is mirror symmetrical to the conveyor 3 with reference to a horizontal plane extending midway between the pulleys 6 for the carrier 3A and pulleys 7 for a similar carrier 4A of the conveyor 4. The shafts 7a (at least one of which is driven by the aforementioned moving means at the speed of the shafts 6a) rotate in the direction indicated by an arrow 9, and the pile of the conveyor 4 comprises elastic filaments or bristles 14. The inner end portions of the bristles 14 are secured to the carrier 4A. The conveyors 3 and 4 can be driven intermittently or continuously, as long as they are set in motion after a block 12 has been expelled from the respective pocket 2. The outer layers 12c, 12a of a block 12 which is being expelled from the pocket 2 occupying the 6 o'clock position on the turret 1 are respectively engaged by and deform the bristles 13, 14, and these bristles thereupon entrain the expelled block 12 so that the cigarettes Z of such block move sideways (arrow 5) toward the inlet A of a stationary funnel 20.

In accordance with a presently preferred embodiment of the invention, the shafts 6a, 7a are driven in synchronism with the turret 1 so that the piles of bristles 13, 14 engage a freshly expelled block 12 while the conveyors 3, 4 are at a standstill and that the conveyors 3, 4 are thereupon advanced through a distance which suffices to move the freshly expelled block 12 out of the way, i.e., to the right of the locus of the block 12 which is shown in FIG. 1 between the lower stretch of the carrier 3A and the upper stretch of the carrier 4A.

The means for feeding blocks 12 into the path P comprises a reciprocable ejector or transfer member 11 here shown as a pusher which registers with the lowermost pocket 2 of the turret 1 and is caused to perform a working stroke (see the arrow 10 in FIG. 2) whenever a block 12 in the registering pocket 2 must be expelled from the turret. The signals for actuation of the pusher 11 can be supplied by a detector (not shown) which monitors the pockets 2 upstream of the pusher (as considered in the direction of rotation of the turret 1) for the presence and/or quality of cigarettes Z in such pockets and/or by a detector (not shown) which monitors the feed of blanks and/or packs to the aforementioned region or station where satisfactory blocks 12 are to come into contact with blanks and/or packs. The pusher 11 has a front face which is only slightly smaller than the cross-sectional area of a pocket 2 so that, while moving in the direction indicated by arrow 10, the pusher can expel an entire block 12 whereby such block enters the path P and is moved (arrow 5) as soon as the conveyors 3, 4 are set in motion in response to indexing of the turret 1.

Each complete group or block 12 is assumed to consist of twenty parallel cigarettes Z in the customary formation including two outer layers 12a, 12c of seven cigarettes each and a median layer 12b of six cigarettes which are staggered with respect to the cigarettes of the outer layers. It will be seen that the two piles of bristles 13, 14 are adjacent to the opposite sides of the path P into which selected blocks 12 are being fed by the pusher 11 whenever the latter receives a signal as a result of detected incompleteness or other defect of a block and/or as a result of detected malfunctioning of the means for supplying blanks and/or partially completed packs. The blanks may consist of metallic foil, paper, cardboard, synthetic plastic material or the like.

A block 12 which reaches the end of the path P is discharged by the bristles 13, 14 onto a horizontal wall 22 which flanks the underside of the inlet A of the funnel 20. This funnel serves as a means to introduce cigarettes Z into a receptacle 21. The funnel 20 further comprises two side walls 23, 24 and a thin rear wall or panel 53 (see FIG. 3). The side wall 23 extends downwardly and outwardly from the horizontal wall 22, and the side wall 24 is located opposite the side wall 23 and is also inclined so that the width of the funnel 20 increases in a direction from the inlet A toward an outlet AA which extends into the receptacle 21. The width of the outlet AA, as considered at right angles to the longitudinal directions of cigarettes Z therein, is slightly less than the width of the receptacle 21 so that the latter can be moved up and down with respect to the side walls 23, 24. Furthermore, such dimensioning of the outlet AA insures that the cigarettes Z are distributed along the full width of the receptacle 21 in spite of the fact that the funnel normally receives blocks 12 at irregular intervals.

The receptacle 21 which is in a position to receive cigarettes Z from the funnel 20 rests on a vertically movable support or platform 27 secured to the upper end of an upright column 28 having a longitudinally extending toothed rack 33 in mesh with a pinion 32 which can be driven clockwise or counterclockwise by an electric motor 29. The latter can move the platform 27 up or down (see the double-headed arrow 31).

The quantity of cigarettes Z which form a supply 26 of rod-shaped articles in the funnel 20 is monitored by a detector 36 here shown as a pressure-responsive switch which is installed on the side wall 24 at the inlet A and has a movable portion extending into the inlet opposite the horizontal wall 22. The detector 36 serves to produce signals which are utilized to start the motor 29 in a direction to lower the platform 27 and the receptacle 21 thereon.

The funnel 20 further comprises a device for retaining the supply 26 of cigarettes Z in the space between the side walls 23, 24 during removal of a filled receptacle 21 and during placing of an empty or standby receptacle 21a onto the platform 27. This retaining device comprises an elongated strip-shaped article-engaging member 49 which is adjacent to the lower ends of the side walls 23, 24 and is spaced apart from and parallel with the rear wall 53 of the funnel 20. The retaining means further comprises a mechanism for moving the member 49 toward or away from the rear wall 53; when the member 49 is caused to move toward the rear wall 53, its rear side abuts against the front ends of cigarettes Z in the outlet AA of the funnel 20 and pushes the rear ends of such cigarettes against the front side of the rear wall 53. Since the cigarettes Z above the member 49 are confined between the side walls 23, 24, such movement of the member 49 toward the rear wall 53 effectively interrupts the escape of cigarettes Z from the funnel 20 even though the front side of the major part of the funnel 20 is preferably open (see FIG. 3).

The mechanism for moving the article-engaging member 49 comprises two electromagnets 39, 41 which are mounted at the outer sides of the walls 24, 23 and have reciprocable armatures 37, 38. The lower ends of the armatures 37, 38 are respectively connected to short cables 43 (one shown in FIG. 3) which are attached to the upwardly extending arms of two bell crank levers 46, 44. The levers 44, 46 are pivotable on pins 48 (one shown in FIG. 3) which are respectively mounted on the side walls 23, 24 of the funnel 20. As shown in FIG. 3 for the bell crank lever 44, the lower arm of this lever is articulately connected with the respective end portion of the article-engaging member 49. When the electromagnet 41 of FIG. 3 is energized, its armature 38 moves upwardly (arrow 52 in FIG. 3) and pivots the bell crank lever 44 through the medium of the cable 43. The corresponding end portion of the member 49 is then moved toward the rear wall 53 of the funnel 20. A helical spring 57 is attached to the side wall 23 and tends to pivot the bell crank lever 44 against a stop 54. When the lever 44 abuts against the stop 54 (i.e., when the electromagnet 41 is deenergized), the respective end portion of the member 49 is located at a maximum distance from the rear wall 53 so that the outlet AA of the funnel 20 is open and cigarettes Z are free to descend into a receptacle on the platform 27. A second stop 56 is provided on the side wall 23 to limit the extent of pivotal movement of the bell crank lever 44 in response to energization of the electromagnet 41; this stop prevents excessive deformation and eventual crushing of cigarettes Z between the member 49 and rear wall 53. The manner in which the other bell crank lever 46 can be pivoted by the electromagnet 39 and a spring (not shown in FIG. 1) is the same as described for the lever 44. The electromagnets 39, 41 are energized and deenergized simultaneously so that the entire member 49 moves either toward or away from the rear wall 53.

The means for automatically removing a filled receptacle 21 from the platform 27 and for automatically replacing such filled receptacle with an empty or standby receptacle 21a is shown in the lower part of FIG. 1. This removing means comprises a stationary base plate or guide 61 having an opening for the column 28 and an upper side or surface 61a formed with a shallow recess 62 adapted to receive the entire platform 27 when the latter assumes its lower end position (a receptacle 21 which rests on the platform 27 while the latter is fully received in the recess 62 of the base plate 61 is assumed to be properly filled with cigarettes Z). The upper side or surface 27a of the platform 27 is then flush with the upper side 61a of the base plate 61 and the upper end of the filled receptacle 21 is assumed to be located at least slightly below the article-engaging member 49 and the lower edge face of the rear wall 53 of the funnel 20. This renders it possible to push the receptacle 21 off the platform 27 by moving it in the direction indicated by arrow 81 whereby the filled receptacle comes to rest on the upper side 61a in a region to the left of the recess 62.

The recess 62 receives the head of a vertically movable control switch 63 which is biased upwardly by a weak helical spring and has two contacts a and b which are normally open, i.e., the spring is free to expand and to maintain the head of the switch 63 in the position shown in FIG. 1 as long as the upper side 27a of the platform 27 is located at least slightly above the upper side 61a of the base plate 61. When the contact a of the control switch 63 is closed in response to full depression of the head of switch 63 by the platform 27 (i.e., in response to movement of the upper side 27a into the plane of the upper side 61a), the contact a connects an energy source (symbolically shown at 64) with a relay 66 which is thereby energized and closes its switch a to energize the electromagnets 39, 41 (see the conductor means 70) of the mechanism for moving the article-engaging member 49 of the funnel 20 toward the rear wall 53. At the same time, the contact a of the control switch 63 completes a holding circuit for the relay 66 (see the conductor 71) which includes a normally closed limit switch 67 openable by the platform 27 when the latter is returned to its upper end position. Thus, the relay 66 remains energized as long as the limit switch 67 is closed, even if the platform 27 rises above the recess 62, provided that the platform is below that level at which it opens the limit switch 67.

The switch a of the relay 66 further connects the energy source 64 with a time delay relay 68. This relay is connected with the input a of a regulating circuit 69 for the reversible electric motor 29. A second input b of the regulating circuit 69 is connected with the detector 36, and the circuit 69 is further connected with an energy source 30. The circuit 69 may be designed to change the polarity of current which is being supplied to the motor 29. The arrangement is such that the circuit 69 causes the motor 29 to move the platform 27 upwardly when its input a receives a signal from the time delay relay 68. The motor 29 is caused to move the platform 27 downwardly in immediate response to transmission of a signal from the detector 36 to the input b of the regulating circuit 69. Such types of circuits and motors are well known in the art. The input a of the circuit 69 cannot receive a signal when the detector 36 transmits a signal to the input b, and vice versa.

When the movable portion of the control switch 63 is fully depressed by the platform 27 in the recess 62, the contact b of the control switch 63 connects the energy source 64 with a solenoid 72 for a valve 73 which controls the flow of pressurized fluid into and the flow of spent fluid from the chambers 77a, 77b of a fluid-operated motor 77, e.g., a double-acting hydraulic cylinder. The piston 75 of the motor 77 is connected with a piston rod 78 which carries a plate 79 adapted to move an empty receptacle 21a from the adjacent portion of the upper side 61a of the base plate 61 onto the upper side 27a of the platform 27 in the recess 62 and to thereby push a filled receptacle 21 onto the upper side 61a to the left of the recess 62, as viewed in FIG. 1. The ports of the body of the valve 73 are connected with the chambers 77a, 77b and with two conduits 74, 76 which are respectively connected with a source of pressurized fluid (e.g., an oil pump) and with a reservoir. When the contact b of the control switch 63 connects the energy source 64 with the solenoid 72, the valve 73 admits pressurized fluid to the chamber 77a and allows fluid to escape from the chamber 77b whereby the plate 79 moves the empty receptacle 21a in the direction indicated by arrow 81. The piston 75 automatically retracts the plate 79 when the solenoid 72 is deenergized because the conduits 74, 76 are then respectively connected with the chambers 77b and 77a.

Notwithstanding the showing of FIG. 1, the receptacles 21, 21a are preferably identical.

The operation:

If a block 12 of 20 (or fewer) cigarettes Z is to be expelled from its pocket 2, such expulsion takes place when the respective pocket assumes the 6 o'clock position, as viewed in FIG. 1. As mentioned above, a block 12 will be transferred into the funnel 20 if it is incomplete or when a monitoring device has determined that such block will not meet a blank or a partially completed pack during further transport in the packing machine. When the block which is to be expelled moves into register with the pusher 11 (the latter is held in retracted position, as shown in FIG. 2), the pusher performs a working stroke (arrow 10) and transfers the block 12 into the path P whereby the cigarettes Z of the two outer layers 12a, 12c are respectively engaged by and deform the bristles 14, 13 of the conveyors 4, 3. The bristles are sufficiently flexible to permit the block 12 to enter the path P without any or with negligible shifting of cigarettes Z in the layers 12a—12c with respect to each other. This might not be overly important for introduction of cigarettes into the funnel 20 but can be crucial in connection with other applications of the conveyor 3 and/or 4 (or an analogous conveyor) in a tobacco processing plant. Shifting of cigarettes Z in a block 12 which has been introduced into the path P by pusher 11 is undesirable because the cigarettes should remain parallel to each other so that they can move sideways when the conveyors 3, 4 are set in motion; this insures proper filling of the funnel 20 and proper stacking of cigarettes in a receptacle 21 on the platform 27.

The turret 1 is indexed as soon as the pusher 11 is returned to the retracted position of FIG. 2, and the conveyors 3, 4 are set in motion simultaneously with the turret to advance the block 12 along the path P by a step (in the direction indicated by arrow 5). Successively delivered blocks 12 push the preceding blocks 12 along the upper side of the horizontal wall 22 so that the cigarettes Z of such blocks enter the funnel 20 through the inlet A. The electromagnets 39, 41 are deenergized because the platform 27 is assumed to be located above the base plate 61 and to maintain the limit switch 67 in open position. The motor 29 is at a standstill. When the receptacle 21 on the platform 27 is filled with cigarettes Z to the level of the member 49, it cannot receive additional cigarettes; therefore, when the conveyors 3, 4 deliver a further block 12 onto the surface 22, such cigarettes cause the cigarettes of the preceding block to press against the movable portion of the switch 36 which is thereby closed and transmits a signal to the input b of the regulating circuit 69. The latter immediately starts the motor 29 in a direction to move the platform 27 downwardly whereby the funnel 20 discharges cigarettes into the descending receptacle 21 (via outlet AA) and the pressure of cigarettes upon the movable contact of the switch 36 decreases. The motor 29 is arrested as soon as the switch 36 opens. The same operation is repeated again and again at regular or irregular intervals, depending upon the frequency at which the pusher 11 is caused to perform working strokes in order to introduce blocks 12 into the path P between the upper stretch of the pile of bristles 14 on the conveyor 4 and the lower stretch of the pile of bristles 13 on the conveyor 3.

When the container 21 on the platform 27 is filled, the latter enters the recess 62 of the base plate 61 and closes the control switch 63 as soon as the surface 27a descends to the level of the surface 61a. The contact a of the switch 63 energizes the relay 66 whose switch a energizes the electromagnets 39 and 41. The contact a of the switch 63 also connects the energy source 64 with the time delay relay 68. The latter transmits a signal to the input a of the regulating circuit 69 with a preselected delay which suffices to replace the filled receptacle 21 with an empty receptacle 21a. The holding circuit including the conductor means 71 and the limit switch 67 (the latter is closed because the platform 27 has descended into the recess 62) maintains the relay 66 in energized condition even after the control switch 63 opens again (as long as the limit switch 67 remains closed).

The contact b of the control switch 63 connects the energy source 64 with the solenoid 72 which is energized and causes the valve 73 to connect the conduit 74 with the chamber 77a so that the piston 75 of the motor 77 moves the plate 79 forwardly (arrow 81) and the empty receptacle 21a (which has been placed onto the base plate 61 to the right of the recess 62) is pushed against the filled receptacle 21 and causes the latter to move beyond the surface 27a and to come to rest on the surface 61a to the left of the recess 62.

The energization of relay 66 and the resulting energization of electromagnets 39, 41 entails a movement of the article-engaging member 49 of the funnel 20 toward the rear wall 53 so that the outlet AA is effectively closed on blocked during removal of the filled receptacle 21.

When the empty receptacle 21a comes to rest on the surface 27a of the platform 27, the time delay relay 68 transmits a signal to the input a of the regulating circuit 69 whereby the motor 29 begins to move the platform 27 (and the receptacle 21 thereon) upwardly. The switch 63 opens its contacts a and b so that the solenoid 72 is deenergized and the valve 73 is automatically reset to connect the conduit 74 with the chamber 77b of the motor 77. Therefore, the plate 79 is retracted to the position shown in FIG. 1 and provides room for the placing of a further empty receptacle onto the base plate 61 to the right of the recess 62.

When the platform 27 reaches its upper end position, it opens the limit switch 67 so that the relay 66 is deenergized (the limit switch 67 is connected in the holding circuit of the relay 66) whereby the relay 66 deenergizes the electromagnets 39, 41 and the springs 57 are free to move the article-engaging member 49 of the funnel 20 away from the rear wall 53. The outlet AA of the funnel 20 is open again and cigarettes Z of the supply 26 in the funnel can descend into the receptacle 21a. The relay 68 is deenergized in response to deenergization of the relay 66 so that the motor 29 is arrested as soon as the platform 27 reaches its upper end position in which the limit switch 67 is open. The pressure-responsive switch 36 thereupon again initiates downward movements of the platform 27 whenever necessary in view of excessive accumulation of cigarettes Z in the inlet A of the funnel 20. The filled receptacle 21 is removed from the base plate 61 and its contents can be transferred into the receptacle or magazine of the packing machine, i.e., into that magazine from which cigarettes Z are being withdrawn to be assembled into blocks 12 which are thereupon introduced into the pockets 2 of the turret 1.

The receptacles 21, 21a preferably resemble or constitute conventional chargers or trays which are still used in many production lines for cigarette packs or the like to transport plain or filter cigarettes from cigarette making machines to packing machines. If desired, the packing machine can be equipped with an automatic transporting system which removes filled receptacles 21 from the base plate 61 (to the left of the recess 62), which thereupon evacuates the contents of filled receptacles 21 into the magazine of the packing machine, and which returns empty receptacles (21a) onto the base plate 61 in front of the retracted plate 79.

The expression "pile" is intended to denote a preferably endless body of parallel or nearly parallel elongated elastically deformable filaments which may constitute relatively soft (readily pliable) bristles. By way of example, the filaments may constitute cut or looped yarns which are at least slightly elastic and which, together with their carrier, resemble a fabric known as velvet, Turkish toweling or the like.

It is also possible to apply the pile to the periphery of the rim of a wheel- or roller-shaped conveyor, especially if one or more layers of cigarettes or the like are to be transported from a higher level to a lower level or vice versa. A wheel- or roller-shaped conveyor can cooperate with one of the conveyors 3, 4 shown in FIG. 1.

Figure 4A:
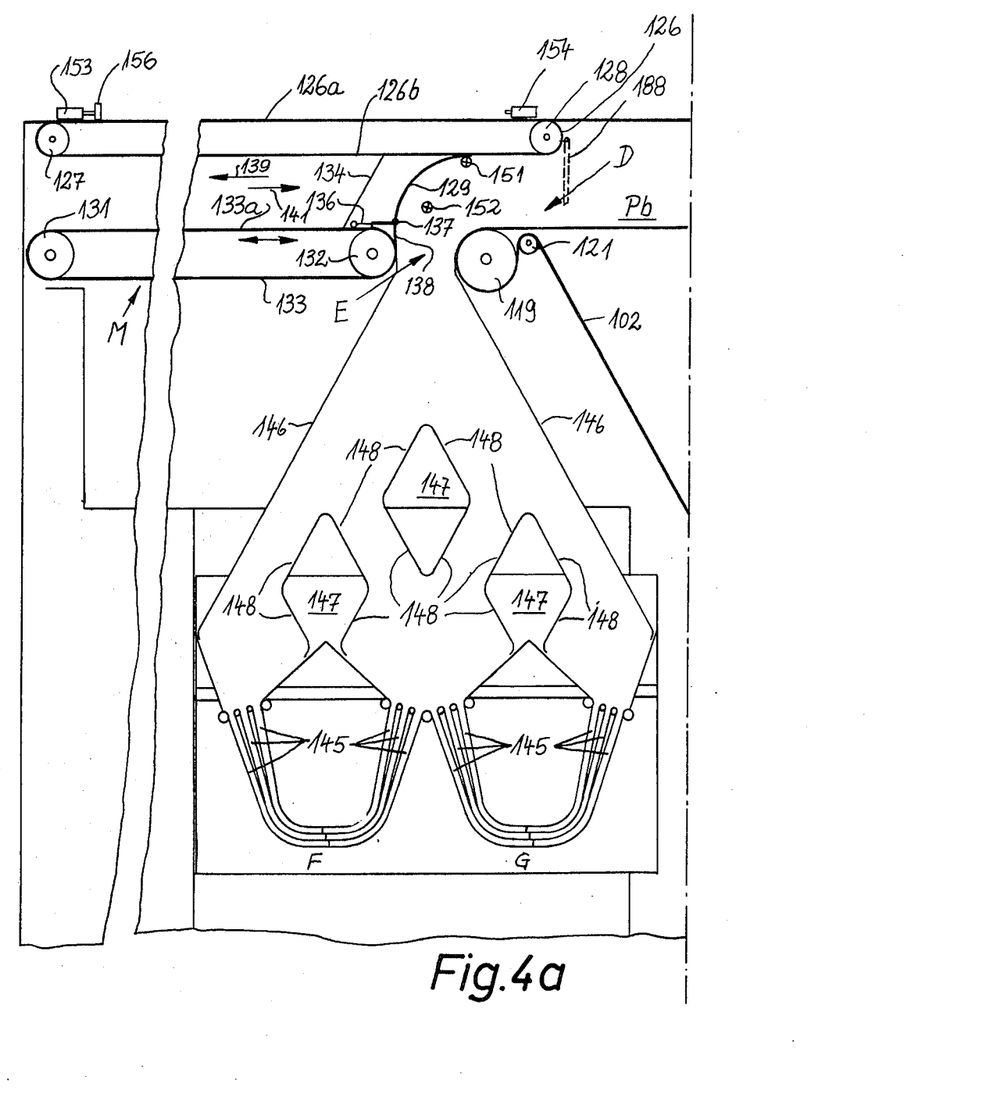
Figure 4B:
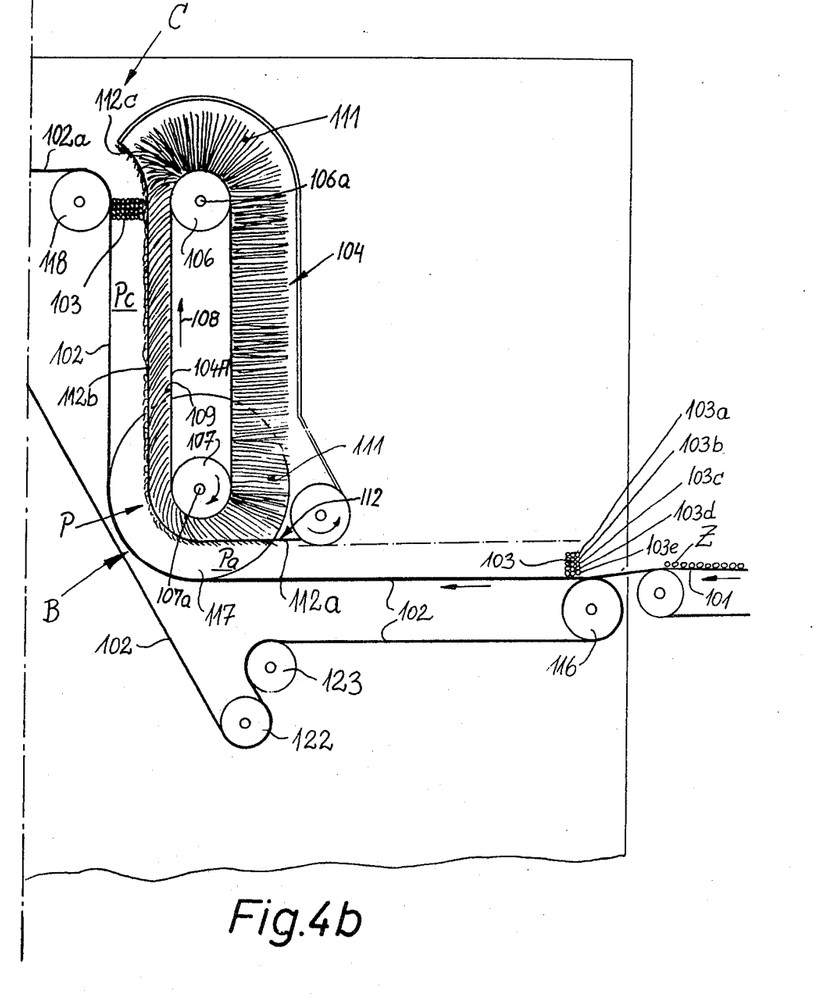

FIGS. 4a and 4b show a portion of a cigarette making machine (having an endless take-off conveyor 101 for plain or filter-tipped cigarettes Z), a portion of a packing machine (having a receptacle or bin 146), and a unit which serves to transport cigarettes Z from the cigarette making machine to the packing machine. This transporting unit includes an endless conveyor 104 which is similar to the conveyor 3 or 4 of FIGS. 1–2. The transporting unit further comprises a variable-volume or variable-capacity magazine M through or adjacent to which the cigarettes Z pass on their way from the take-off conveyor 101 into the bin 146.

The cigarette making machine turns out a single row of cigarettes Z which are transferred onto the upper stretch of the take-off conveyor 101 and move thereon sideways in the direction indicated by arrow. Such cigarettes are transferred onto the adjacent stretch of an endless belt conveyor 102 which forms part of the transporting unit and cooperates (along a predetermined length of the path for the transport of cigarettes Z from the conveyor 101 toward the magazine M) with the aforementioned endless conveyor 104. The conveyor 102 is driven at a speed which is less than the speed of the take-off conveyor 101 so that the single row or layer of cigarettes Z on the conveyor 101 is converted into a stream 103 consisting of several superimposed layers (FIG. 4b shows a stream which consists of a substantial number of layers including the layers 103a, 103b, 103c, 103d and 103e). Such slowing down of cigarettes Z at the transfer station between the conveyors 101 and 102 is desirable not only because the conveyor 102 is capable of cooperating with the conveyor 104 to move an entire stream of cigarettes from a lower level (of the conveyor 101) to a higher level (of the inlet D of the magazine M) but also because the slowly advancing cigarettes Z of the stream 103 can be visually inspected (and the defective cigarettes removed and/or the misaligned cigarettes reoriented). This is impossible or practically impossible in connection with cigarettes Z on the upper stretch of the conveyor 101 because a modern cigarette making machine is capable of turning out up to and in excess of 4,000 articles per minute. At such speeds, the naked eye is incapable of following the movements of individual cigarettes and much less of detecting misalignment or any flaws of the fillers, wrappers and/or filter rod sections.

The elongated path P which is defined by the conveyors 102, 104 for the stream 103 of cigarettes Z includes a horizontal or nearly horizontal first portion Pa (upstream of a level changing station B), a horizontal or nearly horizontal second portion Pb (above the stretch 102a of the conveyor 102) and a partially arcuate and partially straight intermediate portion Pc whose ends merge gradually into the portions Pa and Pb. The portions Pa and Pb are located at different levels.

The improved conveyor 104 comprises an endless flexible belt-like carrier 104A which is trained over pulleys 106, 107. The pile of elastically deformable (flexible) filaments or bristles 111 surrounds the carrier 104A and one end portion of each bristle 111 is secured to the outer side or surface 109 of the carrier 104A, i.e., to that side which faces the portions Pa, Pb, Pc of the path P for the stream 103. At least one of the pulleys 106, 107 is driven by the respective shaft 106a or 107a so that the carrier 104A is caused to move in the direction indicated by arrow 108. The speed of the carrier 104A is preferably identical or practically identical with the speed of the conveyor 102. It is preferred to employ a common prime mover for the conveyors 102, 104 so that the conveyor 102 is arrested in automatic response to stoppage of the conveyor 104 and vice versa.

The carrier 104A begins to move away from the adjacent portion of the conveyor 102 at a station C where the portion Pb of the path P begins; from there on, the stream 103 is moved toward the inlet D of the magazine M by the upper stretch 102a of the conveyor 102. At the station C, the outermost layer 103a of the stream 103 is guided by the bristles 111 and/or by the concave surface of the uppermost portion 112c of an arcuate guide 112 consisting of thin sheet metal or the like. The median portion 112b of the guide 112 is adjacent to the portion Pc of the path P and is formed with a large cutout (not specifically shown) so that the bristles 111 can engage and entrain the cigarettes Z of the layer 103a. The layer 103a is entrained by the adjacent surface of the conveyor 102, and the layers 103b–103d move the layers 103a, 103e because the bristles 111 yieldably urge the layer 103a in a direction toward the adjacent portion of the conveyor 102. The lowermost portion 112a of the guide 112 serves to flex the bristles 111 before they engage the cigarettes Z of the layer 103a in the portion Pa of the path P; this is desirable because, otherwise, the bristles 111 could shift the cigarettes of the layer 103a with respect to the cigarettes of the adjacent layer or layers. As a rule, the portion 112c of the guide 112 will flex the bristles 111 away from contact with the adjacent cigarettes of the layer 103a so that the bristles cannot straighten out abruptly; this could cause undesirable shifting of cigarettes in the adjacent portion of the layer 103a with respect to cigarettes in the neighboring layer or layers.

The belt conveyor 102 is trained over pulleys 116, 117, 118, 119, 121, 122 and 123. At least one of these pulleys is driven, normally without interruptions, at the speed of the pulley 106 and/or 107 for the carrier 104A. The stretch 102a can be said to form part of the magazine M because it can convey cigarettes Z of the stream 103 into and even beyond the inlet D. The magazine M further comprises two additional endless belt conveyors 126 and 133. The conveyor 126 is trained over pulleys 127, 128 and is connected with an arcuate end wall 129 of the magazine M. The end wall 129 is further connected to the upper stretch 133a of the conveyor 133 which is trained over two pulleys 131, 132. As shown in FIG. 4a, the end wall 129 has a concave surface which faces the inlet D. The reference character 134 denotes a reinforcing or stiffening rib for the end wall 129; this rib is rigid with the convex side of the wall 129 and is parallel to the plane of FIG. 4a. Whereas the upper end portion of the wall 129 is or can be rigidly connected with the lower stretch 126b of the conveyor 126, its lower end portion is indirectly coupled to the stretch 133a by way of a short plate 136. The latter is rigid with the upper stretch 133a and is connected to the lower end portion of the end wall 129 by a hinge 137. The hinge 137 further connects the parts 129, 136 with a short apron 138 which is substantially tangential to the pulley 132 when the end wall 129 assumes the right-hand end position shown in FIG. 4a. When the upper stretch 133a of the conveyor 133 is moved in the direction indicated by arrow 139, or in the direction indicated by arrow 141, the apron 138 slides along the outer side of the conveyor 133 to thus prevent wedging of one or more cigarettes Z between the upper stretch 133a and the end wall 129.

The outlet E of the magazine M is the inlet of the bin 146 and is located between the pulleys 119, 132. It will be seen that the horizontal stretches 102a, 133a of the conveyors 102, 133 are located above and at the opposite sides of the outlet E (i.e., inlet of the bin 146). The cigarettes Z which are stored in the magazine M rest on the stretch 133a of the conveyor 133 and/or on the stretch 102a of the conveyor 102. The lower end portion of the bin 146 is formed with ducts 145 each of which is designed to receive a single column or row of cigarettes Z. The lower end portions of the ducts 145 are located at two discrete transfer stations F, G at each of which a pusher (analogous to the transfer member 11 of FIG. 2) intermittently expels from the bin 146 a group or block 12 of cigarettes Z for transfer into an empty pocket 2 of the turret 1 of FIG. 1 or into a similar pocket which is provided on a conveyor (not shown) serving to supply blocks 12 to the turret 1. The lower portions of the ducts 145 in the bin 146 are configurated in such a way that the cigarettes Z therein are automatically arrayed in formations or blocks of the type shown in FIGS. 1 and 2. Of course, such ducts are employed only if the packing machine is to apply envelopes around blocks of twenty cigarettes each. It is evident that the ducts 145 will be configurated and/or disposed differently if each block of cigarettes is to contain only 10 cigarettes, only four or five cigarettes, or 20 cigarettes which form two rows of 10 cigarettes each.

The interior of the bin 146 contains suitably configurated baffles 147 which may but need not be agitated and have external surfaces 148 of such inclination that they promote the descent of cigarettes Z from the outlet E of the magazine M into the ducts 145.

The conveyors 126, 133 of the magazine M can be driven as a unit at regular or irregular intervals, either in a first direction (see the arrow 139) or in the opposite direction (arrow 141), depending upon whether the volume of the magazine M is to be increased or reduced. The prime mover 161 (e.g., a multiphase current motor shown in FIG. 5) is started in a desired direction or arrested in response to signals which are supplied by two monitoring devices here shown as photoelectric detectors 151, 152. The detector 152 is mounted immediately above or close to the common level of the stretches 102a, 133 above the outlet E of the magazine M, and the detector 151 is mounted at a level above the detector 152. The means for controlling the operation of the prime mover 161 further comprises two limit switches 153, 154 which are mounted above the upper stretch 126a of the conveyor 126. The stretch 126a carries an actuating element or trip 156 which actuates the limit switch 153 when the volume of the magazine M has been increased to the maximum permissible value. The trip 156 actuates the limit switch 154 when the volume of the magazine M has been reduced to a minimum permissible value.

Figure 5:
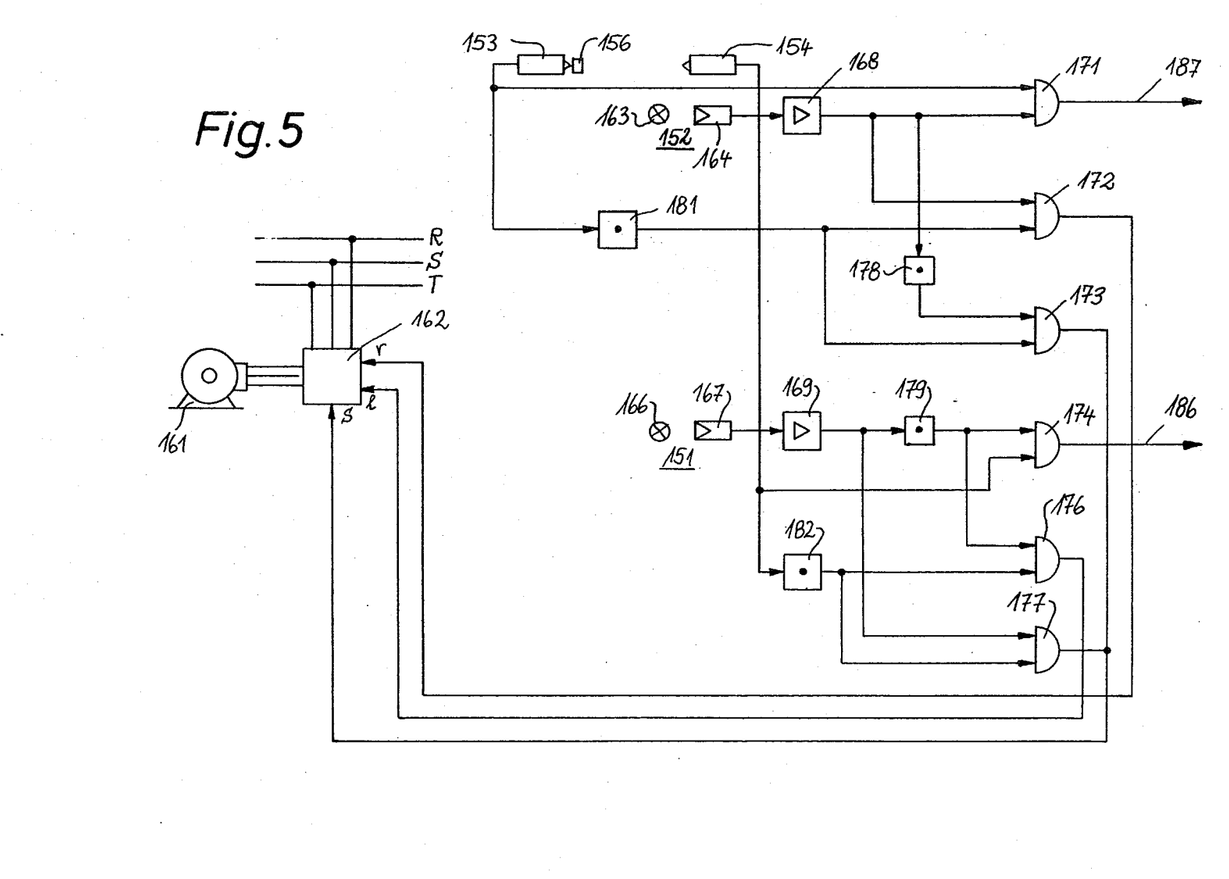
FIG. 5 is a diagram of the control circuit for the apparatus of FIG. 4.

The control circuit for the transporting unit of FIGS. 4a and 4b is shown in FIG. 5. This circuit includes a regulating circuit 162 which can start the prime mover 161 in a first direction or in a second direction (see the arrows 139, 141 in FIG. 4a) or arrests the prime mover. The circuit 162 is connected with a source of polyphase current having leads R, S and T. When the input r of the regulating circuit 162 receives a signal, the circuit 162 starts the prime mover 161 in a direction to move the end wall 129 of the magazine M toward the inlet D (arrow 141). The transmission of a signal to the input l of the regulating circuit 162 results in such operation of the prime mover 161 that the end wall 129 moves away from the inlet D (arrow 139). A signal to the input s of the regulating circuit 162 arrests the prime mover 161.

The photoelectric detectors 151, 152 respectively comprise light sources 166, 163 and photosensitive transducers 167, 164. The transducers 164, 167 transmit signals to amplifiers 168, 169 when they are exposed to light issuing from the respective sources 163, 166. The amplifier 168 is connected with the first inputs of three AND-gates 171, 172, 173, and the amplifier 169 is connected with the first inputs of three AND-gates 174, 176, 177. The second inputs of the AND-gates 171–173 are connected with the limit switch 153, and the second inputs of the AND-gates 174, 176–177 are connected with the limit switch 154. The reference characters 178, 179, 181 and 182 denote four signal inverting circuits of the type known as NO-gates. The NO-gate 178 is connected between the amplifier 168 and the first input of the AND-gate 173; the NO-gate 179 is connected between the amplifier 169 and the first input of the AND-gate 174; the NO-gate 181 is connected between the limit switch 153 and the second inputs of the AND-gates 172, 173; and the NO-gate 182 is connected between the limit switch 154 and the second inputs of the AND-gates 176, 177. The limit switches 153, 154 respectively produce signals in response to depression of their movable contacts by the trip 156 on the upper stretch 126a of the conveyor 126.

The operation of the structure shown in FIGS. 4a, 4b and 5 is as follows:

The cigarette making machine is assumed to operate normally so that it turns out a continuous row of cigarettes Z which move sideways with the upper stretch of the take-off conveyor 101 and are converted into a stream 103 at the transfer station between the conveyors 101 and 102. The conveyor 102 advances the stream 103 including the layers 103a–103e toward the portion Pa of the path P where the cigarettes of the layer 103a are engaged and entrained by the deformed bristles 111 of the pile on the carrier 104A of the endless conveyor 104. The flexing of bristles 111 is effected by the lower end portion 112a of the arcuate guide 112. The bristles 111 prevent the cigarettes Z of the layer 103a from rolling backwards at the level changing station B (i.e., in the arcuate lowermost region of the portion Pc of the path P). This is achieved by causing the bristles 111 to bear against the layer 103a which urges the layers 103b–103d against the layer 103e; the latter is engaged and advanced by the adjacent surface of the conveyor 102. The flexibility of bristles 111 is sufficiently pronounced to avoid any permanent deformation or other damage to the cigarettes Z of the layer 103a; however, the bristles are sufficiently firm to cooperate with the conveyor 102 for the purpose of moving the entire stream 103 along the path P without appreciable shifting of cigarettes in the layers 103a–103e.

The carrier 104A begins to move away from the layer 103a in the arcuate uppermost part of the path portion Pc, and the bristles 111 are held against abrupt straightening by the arcuate portion 112c of the guide 112 so that the cigarettes Z of the layer 103a at the station C remain parallel to each other and cannot roll with respect to the cigarettes of the other layers. The portion 112c of the guide 112 further reduces the likelihood of misalignment of cigarettes Z at the station C when the conveyors 102, 104 are brought to a halt.

The stretch 102a of the conveyor 102 thereupon transports the layer 103 into the inlet D of the magazine M and on toward the outlet E. The movable end wall 129 of the magazine M is assumed to dwell in the right-hand end position shown in FIG. 4a, i.e., the volume of the magazine M has been reduced to a minimum. The trip 156 on the upper stretch 126a of the conveyor 126 abuts against the limit switch 153 so that the latter transmits a signal to the second input of the AND-gate 171 but not to the second inputs of the AND-gates 172, 173 (see the NO-gate 181). Since the trip 156 is remote from the limit switch 154, the latter does not transmit a signal to the second input of the AND-gate 174 but the second inputs of the AND-gates 176, 177 receive signals from the NO-gate 182. The outlet E of the magazine M (i.e., the inlet of the bin 146) is filled with cigarettes Z to the level of the photoelectric detector 152 so that the cigarettes interrupt the light beam from the source 163 to the transducer 164. The packing machine is idle as long as the light beam from at least one of the sources 163, 166 can reach the respective transducer. Thus, the aforementioned pusher does not expel blocks 12 from the ducts 145 at the transfer stations F and G. Since the cigarette making machine is in operation, the conveyor 101 delivers cigarettes Z to the conveyor 102 and the upper stretch 102a of the conveyor 102 feeds successive increments of the stream 103 into the inlet D. The cigarettes Z pile up between the inlet D and outlet E and ultimately interrupt the light beam from the source 166 to the transducer 167 of the photoelectric detector 151. Consequently, the signal from transducer 167 to the amplifier 169 is interrupted; however, the NO-gate 179 begins to transmit a signal to the first input of the AND-gate 176. The second input of the AND-gate 176 simultaneously receives a signal from the NO-gate 182 because the latter does not receive a signal from the limit switch 154 (which is not actuated by the trip 156). The output of the AND-gate 176 transmits a signal to the input l of the regulating circuit 162 whereby the prime mover 161 begins to move the end wall 129 in the direction indicated by arrow 139, i.e., the volume of the magazine M begins to increase and the magazine takes up the output of the cigarette making machine.

When the end wall 129 assumes a position in which the magazine M has accepted at least some of the cigarettes Z between the inlet D and outlet E, i.e., when the light beam issuing from the source 166 of the detector 151 can reach the transducer 167, the latter transmits a signal to the amplifier 169 and NO-gate 179 whereby the signal at the first input of the AND-gate 176 disappears and the output of the AND-gate 176 interrupts the transmission of a signal to the input $l$ of the regulating circuit 162. At the same time, the amplifier 169 transmits a signal to the first input of the AND-gate 177 the second input of which receives a signal from the NO-gate 182 because the latter does not receive a signal from the limit switch 154. The AND-gate 177 transmits a signal to the input $s$ of the regulating circuit 162 whereby the prime mover 161 remains idle (i.e., it is disconnected from the energy source RST). If the rate of consumption of cigarettes Z by the packing machine thereupon equals the rate at which the cigarette making machine supplies cigarettes to the conveyor 102, the prime mover 161 remains idle because all of the cigarettes Z which enter the inlet D can leave the magazine M by way of the outlet E to be evacuated from the bin 146 at the transfer stations F and G. However, if the rate of removal of cigarettes from the bin 146 is less than the rate at which the stretch 102a of the conveyor 102 feeds the stream 103 into the inlet D, the light beam between the source 166 and transducer 167 is interrupted whereby the output of the AND-gate 176 again transmits a signal to the input $l$ of the regulating circuit 162 and the prime mover 161 is started to increase the volume of the magazine M (arrow 139 in FIG. 4a). The prime mover 161 is arrested again in the aforedescribed manner (the AND-gate 177 transmits a signal to the input $s$ of the circuit 162) when the volume of the magazine M increases sufficiently to accept the cigarettes Z between the inlet D and outlet E to such an extent that the light beam from the source 166 can reach the transducer 167.

If the rate at which the cigarettes Z are being removed from the bin 146 at the transfer stations F and G exceeds the rate at which the conveyor 102 feeds cigarettes into the inlet D, the level of cigarettes above the outlet E descends below the photoelectric detector 152 so that the transducer 164 transmits a signal to the amplifier 168. Such signal is transmitted to the first input of the AND-gate 172 whose second input receives a signal from the NO-gate 181 because the latter does not receive a signal from the limit switch 153 (the trip 156 has been moved to a position somewhere between the limit switches 153 and 154). The output of the AND-gate 172 transmits a signal to the input $r$ of the regulating circuit 162 whereby the prime mover 161 moves the end wall 129 (through the medium of the conveyors 126, 133) in a direction to reduce the capacity of the magazine M (arrow 141) whereby the bin 146 receives the entire output of the cigarette making machine plus those cigarettes which are being expelled from the magazine M in response to movement of the end wall 129 toward the inlet D. The transmission of signal from the output of the AND-gate 172 to the input $r$ of the circuit 162 is interrupted as soon as the level of cigarettes Z between the inlet D and outlet E rises above the light beam between the source 163 and transducer 164. At the same time, the output of the AND-gate 173 transmits a signal to the input $s$ of the circuit 162 so that the connection between the energy source RST and the prime mover 161 remains interrupted. The AND-gate 173 transmits a signal because its first input receives a signal from the NO-gate 178 (the amplifier 168 does not receive a signal from the transducer 164) and its second input receives a signal from the NO-gate 181 because the input of the NO-gate does not receive a signal from the limit switch 153.

The same procedure is repeated when the rate of consumption (removal of cigarettes Z from the bin 146) again exceeds the rate at which the stretch 102a of the conveyor 102 feeds the stream 103 into the inlet D, i.e., the AND-gate 172 transmits a signal to the input $r$ of the circuit 162 and the prime mover 161 moves the end wall 129 toward the inlet D to thereby reduce the capacity of the magazine M and to supply temporarily stored cigarettes into the bin 146. The movement of end wall 129 in the direction indicated by arrow 141 is interrupted as soon as the cigarettes Z pile up between the inlet D and outlet E to such an extent that the light beam between the source 163 and transducer 164 is interrupted.

It will be seen that the magazine M can compensate for temporary (relatively short-lasting) deviations of the rate of consumption of cigarettes by the packing machine from the rate at which the cigarette making machine supplies cigarettes to the conveyor 102. The compensation is automatic and need not be supervised by attendants.

If the magazine M is filled to capacity (e.g., due to a malfunction of the packing machine which cannot be eliminated before the end wall 129 reaches its left-hand end position, as viewed in FIG. 4a), the trip 156 actuates the limit switch 154 (it will be noted that the upper stretch 126a of the conveyor 126 travels in a direction to the right while the end wall 129 moves away from the inlet D to increase the capacity of the magazine M). As the pile of cigarettes Z between the inlet D and outlet E continues to rise, the cigarettes interrupt the light beam between the source 166 and transducer 167 of the detector 151 whereby the two inputs of the AND-gate 174 receive signals at the same time and the output of the AND-gate 174 transmits a signal to a conductor 186 which is connected with means (not shown) for arresting the cigarette making machine. The first input of the AND-gate 174 receives a signal because the NO-gate 179 does not receive a signal from the transducer 167 via amplifier 169, and the second input of the AND-gate 174 receives a signal directly from the actuated limit switch 154. The signal which is transmitted to the conductor means 186 further serves to arrest the drive for the conveyors 102, 104 so that the feed of cigarettes to the input D of the magazine M is interrupted.

If the rate at which the packing machine processes cigarettes Z exceeds the rate at which the cigarette making machine supplies cigarettes to the conveyor 102 to such an extent that the capacity of the magazine M is reduced to a minimum permissible value (e.g., due to a longer-lasting malfunction of the cigarette making machine), the end wall 129 reaches the end position shown in FIG. 4a and the trip 156 actuates the limit switch 153. The packing machine continues to accept cigarettes from the bin 146 so that the level of cigarettes at the outlet E descends below the detector 152. Therefore, the AND-gate 171 transmits a signal (via conductor means 187) which arrests the packing machine. The first input of the AND-gate 171 then receives a signal from the amplifier 168 and the second input of the AND-gate simultaneously receives a signal from the actuated limit switch 153.

The apparatus of FIGS. 4a, 4b and 5 is susceptible of many modifications. For example, the photoelectric detector 151 and/or 152 can be replaced with a switch (analogous to the switch 36 of FIG. 1) which is responsive to pressure of cigarettes in the region between the inlet D and outlet E of the magazine M. It is further possible (but optional) to install a flexible flap 188 (shown in FIG. 4a by broken lines) the lower portion of which rests on the uppermost layer of cigarettes Z of the stream 103 and which limits the magnitude of the angle of rest (angle of maximum slope) of cigarettes Z in the region of the inlet D.

It is also within the purview of the invention to replace the conveyor 126 with a conveyor which is similar to the conveyor 3, 4 or 104, i.e., with a conveyor having a pile of bristles which cooperate with the upper stretches 102a and 133a to prevent undesirable shifting of cigarettes in the magazine M. Still further, the conveyor 126 can be shortened so that it does not extend all the way to the inlet D but only to a level substantially above the pulley 132; the apparatus then comprises an additional conveyor which is similar to the conveyor 3, 4 or 104 and replaces the right-hand portion of the shortened conveyor 126. A construction similar to the just mentioned modification is shown in FIG. 6.

Figure 6:
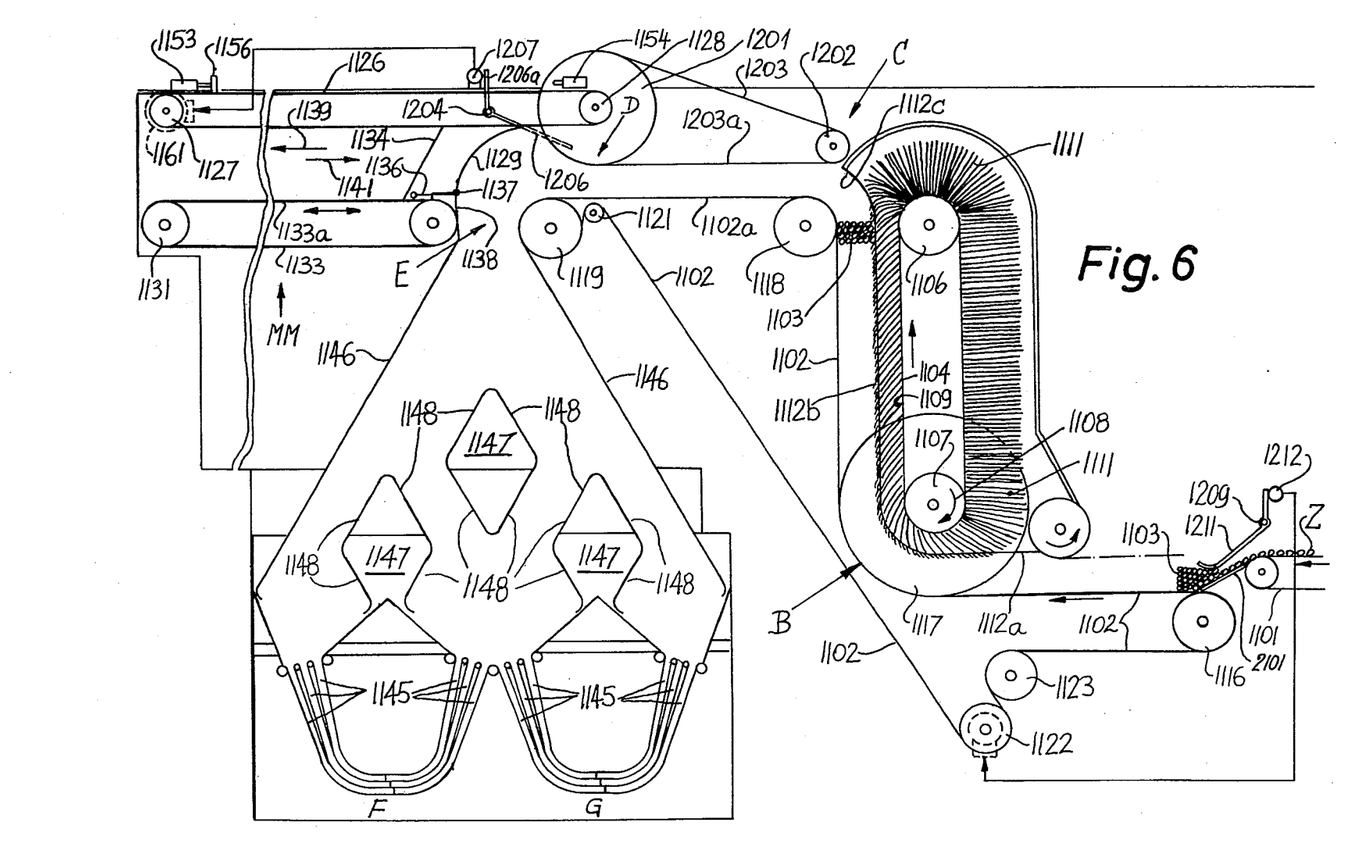
FIG. 6 illustrates a modification of the apparatus shown in FIGS. 4a and 4b.

FIG. 6 shows a portion of a production line which is similar to that of FIGS. 4a, 4b and wherein all such parts which are identical with or analogous to the parts shown in FIGS. 4a, 4b are denoted by similar reference characters plus 1000. The transporting unit of FIG. 6 comprises a further endless belt conveyor 1203 which is trained over pulleys 1201, 1202 and has a lower stretch 1203a spaced apart from, parallel to and located above the stretch 1102a of the endless belt conveyor 1102. As shown, the stretch 1203a extends between the station C and the inlet D. The stretch 1203a can be said to constitute an extension of the endless conveyor 1104 and serves to positively advance the topmost layer of the cigarette stream 1103 on the stretch 1102a.

The endless conveyor 1126 comprises two endless belts which are located in two parallel planes, one in front of and the other behind the pulley 1201 for the conveyor 1203. Thus, the pulley 128 of FIG. 4a is replaced by two pulleys 1128 (only one shown) which are coaxial with the pulley 1201. The left-hand end portions of the two belts of the conveyor 1126 can be trained over a single elongated pulley 1127 or over two discrete pulleys each in line with one of the pulleys 1128.

The detectors 151, 152 of FIGS. 4a and 5 are replaced with an electromechanical monitoring device having a flap 1206 which is pivotably mounted above the outlet E, as at 1204, and has an upwardly extending portion 1206a cooperating with a proximity detector 1207. The detector 1207 controls the operation of the prime mover 1161 for the conveyors 1126, 1133 in a manner analogous to that described for the regulation circuit 162 and prime mover 161 of FIG. 5. Thus, the prime mover 1161 moves the end wall 1129 in the direction indicated by arrow 1139 when the flap 1206 assumes a first angular position and in the direction indicated by arrow 1141 when the flap 1206 assumes a second angular position. The flap 1206 rests on the pile of cigarettes Z at the inlet D of the magazine MM.

The upper stretch of the take-off conveyor 1101 of the cigarette making machine is located at a level at least slightly above the pulley 1116, and the transporting unit further comprises a ramp 2101 along which the cigarettes Z slide onto the conveyor 1102. The ramp 2101 is located below the pivotable flap 1211 of a second electromechanical monitoring device which further includes a pivot 1209 for the flap 1211 and a proximity detector 1212 connected to a variable-speed motor 1213 for the pulley 1122. The flap 1211 causes the detector 1212 to transmit signals which are indicative of the height of the stream 1103 on the conveyor 1102, i.e., of the number of layers of which the stream 1103 consists. The motor 1213 accelerates the conveyor 1102 when the height of the stream 1103 increases and decelerates the conveyor 1102 when the height of the stream 1103 decreases, i.e., in response to variations in the rate at which the conveyor 1101 feeds cigarettes Z to the ramp 2101. Thus, the monitoring device including the flap 1211 and detector 1212 enables the motor 1213 to maintain the height of the stream 1103 within a desirable optimum range (e.g., five layers) which is satisfactory for visual inspection of cigarettes Z on the conveyor 1102 and for removal or reorientation of defective or misaligned articles.

Figure 7:
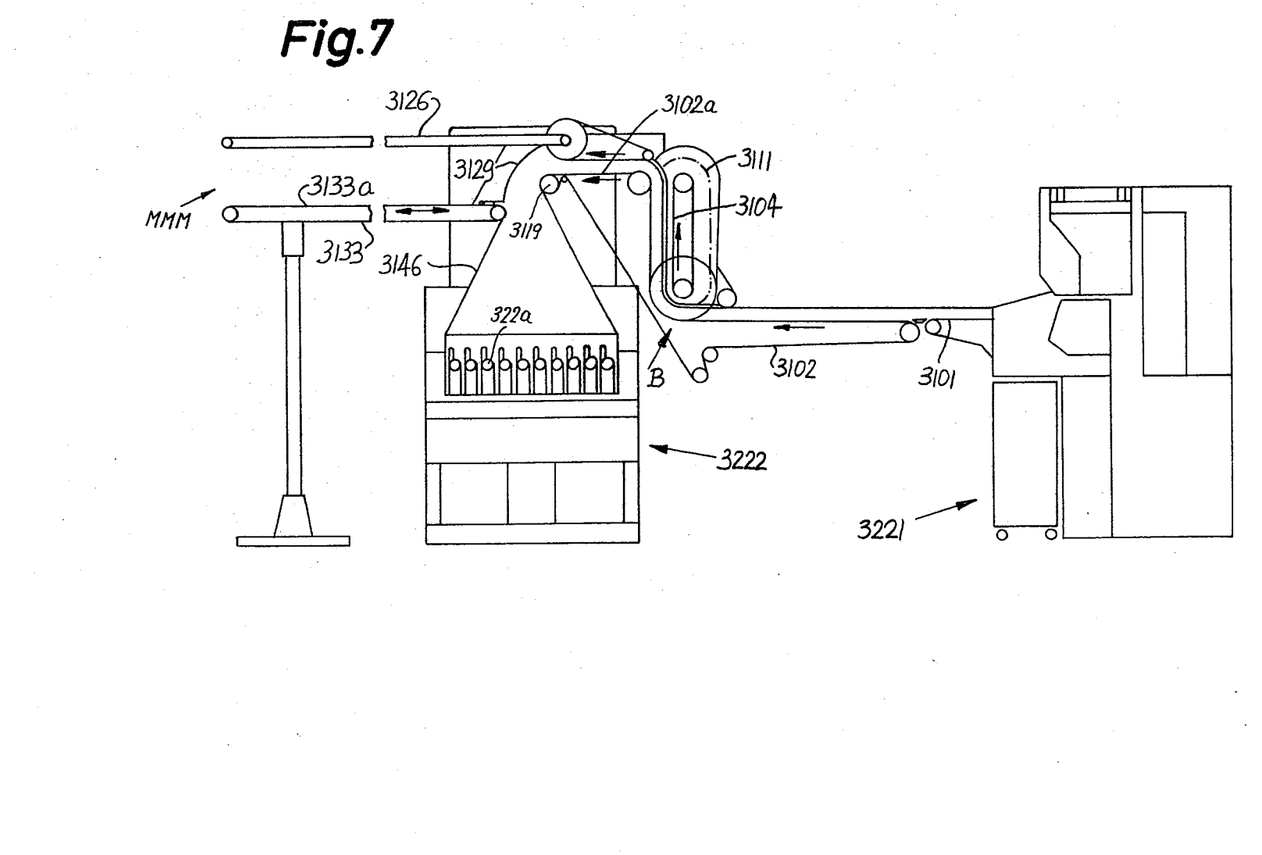
FIG. 7 shows a modification of the apparatus of FIG. 6.

FIG. 7 shows a portion of a production line which includes a filter rod making machine 3221. This machine is similar to that disclosed in commonly owned U.S. Pat. No. 3,741,846 granted June 26, 1973 to Greve and has a take-off conveyor 3101 which feeds a row of discrete filter rod sections (e.g., a six times unit length) to a conveyor 3102 corresponding to the conveyor 1102 of FIG. 6 and cooperating with a conveyor 3104 corresponding to the conveyor 1104 of FIG. 6 to transport a multi-layer stream of filter rod sections into a magazine MMM. The latter serves for temporary storage of filter rod sections at a level above the bin 3146 of a pneumatic sender 3222 of the type disclosed, for example, in commonly owned U.S. Pat. No. 3,789,744 granted Feb. 5, 1974 to Wahle. The sender 3222 has a plurality of pneumatic conveyor tubes 3222a and means for transferring filter rod sections from the bin 3146 into the tubes. Each tube can transport, when necessary, a file of filter rod sections into the magazine, not shown, of a discrete machine for the making of filter cigarettes, cigars or cigarillos.

The purpose of the magazine MMM is to temporarily store filter rod sections when the bin 3146 is filled to capacity but the machine 3221 continues to supply filter rod sections to the conveyor 3102, or to supply filter rod sections to the bin 3146 when the sender 3222 continues to supply filter rod sections to one or more consuming machines while the machine 3221 is idle or operates at less than full capacity. All such parts of the magazine MMM which are identical with or clearly analogous to the corresponding parts of the magazine MM of FIG. 6 are denoted by similar reference characters plus 2000. The only important difference between the magazines MM and MMM is that the upper stretch 3133a of the conveyor 3133 is located well below the level of the pulley 3119, i.e., well below the stretch 3102a of the conveyor 3102, to thereby increase the capacity of the magazine MMM.

The structure of FIG. 7 exhibits all advantages of the structure of FIG. 6. Thus, the speed of the layer of filter rod sections on the conveyor 3102 is sufficiently low to permit for visual observation of sections and detection and removal of defective sections ahead of the station B; the conveyors 3102 and 3104 cooperate to lift the stream of filter rod sections from a lower level to a higher level; and the magazine MMM can compensate for temporary deviations of the rate of delivery of filter rod sections to the conveyor 3102 from the rate of removal of sections from the bin 3146.

The improved conveyors 3, 4, 104, 1104 and 3104 exhibit the advantages that they can cooperate with each other (or with other types of conveyors, see the conveyor 102 in FIGS. 4a–4b, the conveyor 1102 in FIG. 6 or the conveyor 3102 of FIG. 7) to transport filter rod sections or plain or filter-tipped cigarettes, cigars or cigarillos without any deformation and practically without any shifting, even if the conveyed articles form several layers.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

1. In an apparatus for the manufacture and/or processing of cigarettes or analogous rod-shaped articles, a combination comprising a receptacle having an inlet; a first endless flexible conveyor defining an elongated path having a discharge end above and at one side of said inlet, said first conveyor being adjacent to one side of said path; means for feeding into said path a multi-layer stream of articles so that the articles extend at right angles to the direction of movement of said first conveyor and the latter moves the stream along said path toward and into said inlet whereby the articles travel sideways; a second endless flexible conveyor having an upper stretch located above and at the other side of said inlet to receive and store the articles of said stream when said inlet is filled with articles; drive means actuatable to move said upper stretch lengthwise toward and away from said inlet whereby the quantity of stored articles respectively decreases and increases; a third endless flexible conveyor adjacent to the other side of said path, said third conveyor having an endless pile of flexible filaments engaging the articles in said path and means for moving said pile in said direction, said filaments being movable along an endless second path a portion of which coincides with said first mentioned path; and means for flexing said filaments in the region where the filaments reach said portion of said second path.

2. A combination as defined in claim 1, further comprising a wall extending above and movable with said upper stretch to confine the articles on said second conveyor at that end of the supply of stored articles which is remote from said inlet.

3. A combination as defined in claim 1, further comprising means for actuating said drive means, including means for monitoring the accumulations of articles at said inlet.

4. A combination as defined in claim 1, wherein said apparatus comprises a packing machine for rod-shaped articles, said packing machine comprising a magazine which constitutes said receptacle.

5. A combination as defined in claim 1, wherein said upper stretch is substantially horizontal, said first conveyor comprising a second upper stretch which is substantially horizontal and is adjacent to said one side of said inlet.

6. A combination as defined in claim 1, wherein said path has a first portion at the level of said discharge end, a second portion at a different second level, and an at least partially arcuate intermediate portion disposed between and having ends merging into said first and second portions.

7. A combination as defined in claim 6, wherein said second level is disposed below said first mentioned level.

* * * * *